(12) United States Patent
Schoofs (10) Patent No.: US 7,960,949 B2
(45) Date of Patent: Jun. 14, 2011

(54) POWER CONVERTER

(75) Inventor: Frans Schoofs, Valkenswaard (NL)

(73) Assignee: ST-Ericsson SA, Geneva (CH)

( * ) Notice: Subject to any disclaimer, the term of this patent is extended or adjusted under 35 U.S.C. 154(b) by 360 days.

(21) Appl. No.: 11/719,213

(22) PCT Filed: Nov. 8, 2005

(86) PCT No.: PCT/IB2005/053658
§ 371 (c)(1),
(2), (4) Date: Feb. 13, 2009

(87) PCT Pub. No.: WO2006/051479
PCT Pub. Date: May 18, 2006

(65) Prior Publication Data
US 2009/0167262 A1    Jul. 2, 2009

(30) Foreign Application Priority Data

Nov. 12, 2004 (EP) .................................... 04105733

(51) Int. Cl.
*G05F 1/613* (2006.01)
(52) U.S. Cl. ...................................... 323/224; 323/288
(58) Field of Classification Search .................. 323/224, 323/288, 282; 363/59; 327/536
See application file for complete search history.

(56) References Cited

U.S. PATENT DOCUMENTS

| | | | |
|---|---|---|---|
| 6,172,493 B1 * | 1/2001 | Grant | 323/288 |
| 6,242,970 B1 | 6/2001 | Grant et al. | |
| 6,452,814 B1 | 9/2002 | Wittenbreder | |

FOREIGN PATENT DOCUMENTS

| | | |
|---|---|---|
| EP | 0794607 | 9/1997 |
| JP | 2002233139 | 8/2002 |
| WO | WO 03055048 | 7/2003 |

OTHER PUBLICATIONS

International Search Report dated Jul. 31, 2007 in connection with PCT Application No. PCT/IB2005/053658.
Written Opinion of the International Searching Authority dated May 12, 2007 in connection with PCT Application No. PCT/IB2005/053658.

* cited by examiner

*Primary Examiner* — Shawn Riley (57) ABSTRACT

A power converter (1) comprises a voltage level increasing circuit (3) which receives a DC-input voltage (VIN) between first and second power converter inputs (IN1, IN2), and which has an output (O1; O2, O3) to supply an adapted input voltage having either a higher level than the input voltage (VIN) or a polarity opposite to the input voltage (VIN). A down-converter (2) has first and second down-converter inputs (IN3, IN4), a control switch (S1) with a main current path arranged between a first node (N1) and the first downconverter input (IN3), an inductor (L) arranged between the first node (N1) and a load (LO), and a sync switch (S2) arranged between the first node (N1) and the second down-converter input (IN4). A controller (4) controls the control switch (S1), and switches (S3, S4; S3, S4, S5, S6, S7, S8) of the voltage level increasing circuit (3) for either coupling the input voltage (VIN) or the adapted input voltage to the first node (N1) or to the first or second downconverter inputs (IN3, IN4).

18 Claims, 3 Drawing Sheets

POWER CONVERTER

CROSS-REFERENCE TO RELATED APPLICATION(S)

The present application claims priority under 35 U.S.C. §365 to International Patent Application No. PCT/IB2005/053658 filed Nov. 8, 2005, entitled "A POWER CONVERTER". International Patent Application No. PCT/IB2005/053658 claims priority under 35 U.S.C. §365 and/or 35 U.S.C. §119(a) to European Patent Application No. 04105733.2 filed Nov. 12, 2004 and which are incorporated herein by reference into the present disclosure as if fully set forth herein.

The invention relates to a power converter, a mobile apparatus comprising such a power converter, and a wireless transmission system comprising such a mobile apparatus.

Down-converters or buck-converters are well known in the art. A down converter comprises a control switch which periodically connects an inductor between an input voltage and a load. A synchronous rectifier (also commonly referred to as sync switch) or a diode conducts the current through the inductor towards the load when the control switch is opened. When the control switch is closed and the diode or sync switch is opened, the current in the inductor increases because the input voltage has a higher level than the output voltage and energy is stored in the inductor. When the control switch is opened and the diode or sync switch is closed, the inductor is connected in parallel with the load and the current in the inductor decreases, the energy stored in the inductor decreases because it is delivered to the load.

A drawback of the down-converter is that the increase of the energy in the inductor can only be very marginal if the output voltage level is close to the input voltage level, and that the decrease of the energy in the inductor can only be very marginal if the output voltage level is close to zero. In both situations, the down-converter is unable to supply sufficient energy to the load, which deteriorates the dynamic behavior of the down-converter. The down-converter will be unable to quickly follow a step in the energy requested by the load if the output voltage is either close to the input voltage or close to zero. Analogously, the down-converter is unable to quickly follow a requested change of the level of the output voltage if the output voltage is either close to the input voltage or close to zero.

It is an object of the invention to provide a power converter which comprises a down-converter which has an improved dynamic behavior.

A first aspect of the invention provides a power converter as claimed in claim 1. A second aspect of the invention provides a mobile apparatus comprising such a power converter as claimed in claim 18. A third aspect of the invention provides a wireless transmission system comprising such a mobile apparatus as claimed in claim 19. Advantageous embodiments are defined in the dependent claims.

The power converter in accordance with the first aspect of the invention comprises the down-converter and a voltage level increasing circuit. The voltage level increasing circuit receives the power converter input voltage present between a first and a second power converter inputs and supplies an adapted input voltage which has a higher level than the input voltage or which has a polarity opposite to the input voltage of the down-converter.

The down-converter comprises a control switch which has a main current path arranged between the first power converter input and the inductor. The yet free end of the inductor is connected to a load across which the output voltage has to be supplied. The power converter further comprises a controller which controls the control switch of the down-converter and the voltage level increasing circuit to either couple the input voltage or the adapted input voltage to the inductor or to the terminal of the main current path of the control switch which is not connected to the inductor. The down-converter further comprises a sync switch which has a main current path arranged between the second power converter input and the inductor. The sync switch may be a controllable semiconductor switch or a diode. If the sync switch is controllable, the controller has to operate the sync switch in a well-known manner.

If the input voltage is supplied to the inductor, the power converter is operating identically to the prior art down-converter. If the higher adapted input voltage is supplied to the inductor or the terminal, the dynamic behavior of the down-converter is improved when the output voltage level is close to the input voltage level, because the voltage difference across the inductor has been increased. The increased voltage difference allows a faster change of energy in the inductor, and thus it will be possible to respond faster to the load. If the adapted input voltage has the opposite polarity to the input voltage, the dynamic behavior of the down-converter is improved when the output voltage level is close to zero. Again, now the voltage difference across the inductor has been made larger allowing a faster change of the energy in the inductor and thus a faster response to the changing energy consumption of the load.

Depending on the construction of the voltage level increasing circuit, the voltage across the inductor can be increased at least temporarily and the response to fast load variations or desired fast transients in the output voltage level is improved.

In an embodiment in accordance with the invention, the voltage level increasing circuit comprises a part of a well known voltage multiplier. Such a voltage multiplier has at least one section which comprises a capacitor and switches. The switches are operated such that the capacitor is charged to a predetermined level during a charge mode, and that the charged capacitor is switched in series with the input voltage to obtain, temporarily a voltage higher than the input voltage. It is also possible to use the charged capacitor to temporarily supply a voltage which has an opposite polarity to the input voltage. The level of the output voltage of the voltage multiplier depends on the number of sections it contains. The well-known voltage multipliers have a capacitor at their output which holds the output voltage, this capacitor is not present in present invention.

In an embodiment in accordance with the invention, the voltage level increasing circuit comprises a single capacitor and two switches which have to be added to the known down-converter. The two switches of the down-converter are also used in the operation of the voltage multiplier. This embodiment has the advantage that it is possible to supply either the double input voltage or an inverted input voltage to the inductor with a minimal amount of extra components. Due to losses, the voltage level supplied by the voltage multiplier will be somewhat less than the double or inverted level. Furthermore, the voltage across the capacitor may drop somewhat during its discharge period.

In an embodiment in accordance with the invention, the power converter has a first phase wherein the capacitor of the voltage multiplier is charged to substantially the level of the input voltage. In a second phase, the power converter switches the capacitor of the voltage multiplier in series with the input voltage such that substantially the double input voltage is supplied to the inductor. Thus, even if the output voltage of the power converter is close to the input voltage, a sufficient voltage difference is present across the inductor.

In an embodiment in accordance with the invention, the power converter has a first phase wherein the capacitor of the voltage multiplier is charged to substantially the level of the input voltage. In a second phase, the power converter switches the capacitor of the voltage multiplier in series with ground so that substantially the input voltage but opposite polarity is supplied to the inductor. Thus, even if the output voltage of the power converter is close to zero, a sufficient voltage difference is present across the inductor.

In an embodiment in accordance with the invention, instead of the capacitor, an extra battery is used to supply either the higher voltage than the input voltage or a voltage that has the opposite polarity to the inductor. However, it is not as simple as with a capacitor to connect the battery such that it can be used to supply its output voltage in different polarities.

In an embodiment in accordance with the invention, both the voltage level increasing circuit and the down-converter receive the DC-input voltage at their respective inputs.

In an embodiment in accordance with the invention, the voltage level increasing circuit comprises: a first controllable switch with a main current path arranged between the first power converter input and a second node. A second controllable switch has a main current path arranged between the second node and the second power converter input. A third controllable switch has a main current path arranged between the first power converter input and the first down-converter input. A fourth controllable switch has a main current path arranged between the second power converter input and the second down-converter input. A fifth controllable switch has a main current path arranged between the first down-converter input and a third node. A sixth controllable switch has a main current path arranged between the second down-converter input and the third node. A capacitor is arranged between the first node and the third node. The controller controls the first to sixth controllable switches to either obtain a first or a second mode of operation.

In a normal operation mode, the third and the fourth controllable switches are closed and the down-converter receives the DC-input voltage at its inputs. The state of the other switches of the voltage level increasing circuit is not relevant as long as at either side of the capacitor not both of the switches are conductive because this would cause a short circuit.

In another mode of operation, the capacitor is periodically charged to obtain a voltage at the third node which is positive with respect to a voltage at the second node, and to connect the capacitor to the first down-converter input to increase a voltage at this first down-converter input to above the DC-input voltage. Thus, during the charging period of the capacitor the second, third, fourth and fifth switch are closed, while the other switches are open. The voltage across the capacitor is added to the DC-input voltage and supplied to the first down-converter input when the first and the fifth switch is closed while the second, third, and sixth switch are opened.

In a further mode of operation, the capacitor is periodically charged to obtain a voltage at the third node which is negative with respect to a voltage at the second node, and to connect the capacitor to the second down-converter input to lower a voltage at this second down-converter input. Thus, during the charging period of the capacitor the first, third, fourth and sixth switch are closed, while the other switches are open. The voltage across the capacitor is supplied between ground and the second down-converter input when the second and the sixth switch is closed while the first, fourth, and fifth switch are opened.

In an embodiment in accordance with the invention, the adapted input voltage is supplied to the inductor only if it is detected that a step in the power requested by the load is larger than a predetermined value. Consequently, the adapted voltage is only used if required.

In an embodiment in accordance with the invention, the step in the power requested by the load (further also referred to as the load step) is determined by monitoring the output voltage, the differentiated output voltage, a difference voltage which is the difference between the output voltage and the reference voltage, the current through the inductor, or a signal present in a circuit forming the load.

The load step causes a change in the output voltage, because the inverter is not able to immediately respond to the load step. Thus, it is possible to detect a load step by monitoring the output voltage directly, or by monitoring the difference between the output voltage and a reference voltage, or by monitoring a derivative of the output voltage. A load step also causes a change of the current through the inductor, thus also this current can be monitored to detect the load step. In case of a current-mode controlled down-converter, the set current level can change arbitrarily. This change is not immediately followed by the current through the inductor. The difference between the set current level and the inductor current can be used to start the boost action. If the load step is detected by or is known beforehand by a circuit of the load, a signal generated by this circuit can be used.

In an embodiment in accordance with the invention, the power converter has an input which indicates how its output voltage should vary. For example, such an input signal may be received from a base station which commands a handset to change its transmission power. Or such an input signal may be known from the power envelope of an audio signal that has to be amplified. To reach optimal energy consumption in the handset, the output voltage of the power converter, which is supplied to the transmitter amplifier, is controlled to optimally correspond to the actual transmission power. The adapted input voltage is supplied to the inductor of the down-converter if it is detected that the level of the input signal or a change of the input signal exceeds a predetermined value.

In an embodiment in accordance with the invention, the adapted input voltage is supplied to the inductor if the output voltage of the power converter is closer to the input voltage or zero than a predetermined value.

In an embodiment in accordance with the invention the power supply voltage for the down-converter is either the DC-input voltage or a sum of the DC-input voltage and a battery voltage such that the DC-input voltage is boosted. Alternatively, the power supply voltage for the down-converter is either the DC-input voltage or a battery voltage such that the voltage for the down-converter has changed polarity with respect to the polarity of the DC-input voltage.

These and other aspects of the invention are apparent from and will be elucidated with reference to the embodiments described hereinafter, to which, however, the invention is not restricted.

In the various Figures, items which have the same references are identical and perform identical functions.

Figure 1:
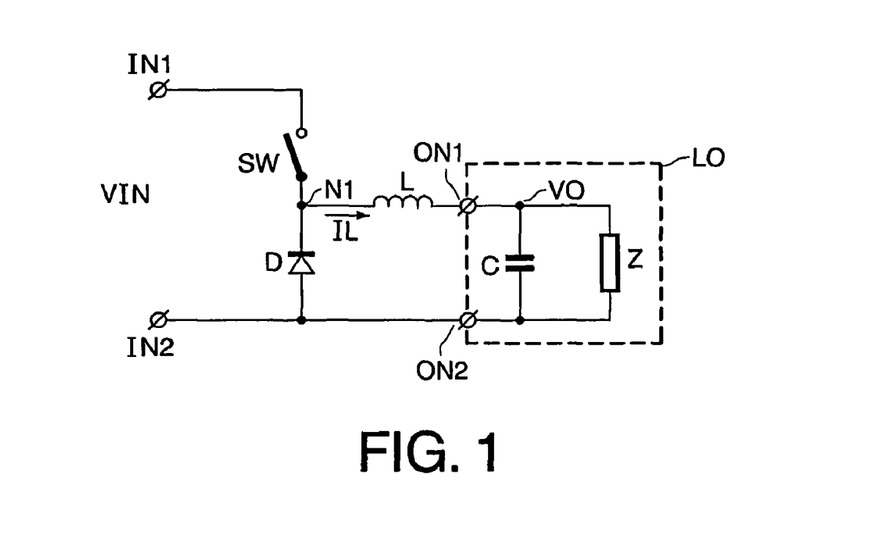
FIG. 1 shows a circuit diagram of a prior art down-converter.

FIG. 1 shows a circuit diagram of a prior art down-converter. The down-converter 1 has input terminals IN1 and IN2 to receive a DC-input voltage VIN and output terminals ON1 and ON2 to supply the output voltage VO to the load LO. For the ease of explanation, the smoothing capacitor C is considered to be part of the load LO. The DC-input voltage VIN may be supplied by a battery or by an AC source, such as the mains, via a rectifier circuit. The down-converter comprises a controllable switch SW arranged between the input terminal IN1 and a node N1. Usually, the controllable switch SW is a semiconductor switch such as a bipolar transistor or a FET. The controllable switch SW is commonly referred to as the control switch. A diode D has a cathode connected to the node N1 and an anode connected to the other input terminal IN2. Instead of the diode D, also a controllable switch can be used which is commonly referred to as the synchronous or sync switch. An inductor L is arranged between the node N1 and the load LO. The inductor L may be a coil or a winding of a transformer. The load LO is considered to comprise a parallel arrangement of a buffer capacitors C and an impedance Z. The impedance Z represents the circuits which draw current from the output of the power converter. The voltage across the load LO is the output voltage VO.

Because this prior art down-converter is well known, its operation is elucidated briefly only. It is assumed that the output voltage VO is stabilized at a fixed level which is equal to or lower than the level of the input voltage VIN, because otherwise the power converter would not be a down-converter. It is further assumed that the components are ideal. When the switch SW is closed, the voltage at the node N1 will be equal to the input voltage VIN and thus the diode D is blocking. Due to the voltage difference VIN-VO over the inductor L, the current IL will increase linearly until the instant the switch SW is opened. The current IL through the inductor L cannot immediately stop flowing, thus the voltage at the node N1 decreases until the diode D starts conducting. Now, due to the voltage—VO across the inductor L, the current IL through the inductor decreases linearly until the instant the switch SW is closed again.

Usually, the duty-cycle of the control switch SW is controlled such that the output voltage VO is stabilized at a desired fixed or variable value independent of the current drawn by the load LO. Thus, for example, if a load step occurs and the current drawn by the impedance Z increases, the output voltage VO tends to decrease. This decrease has to be counteracted by a longer on-time of the switch SW so that the average current in the inductor L increases and a higher amount of energy is transferred to the load LO. Many control topologies are known to stabilize the output voltage Vout at a desired value. The control topology selected is not relevant to the present invention. Alternatively, the power consumed by the load LO may be stable while the output-voltage VO has to vary, or also the output voltage VO has to vary while the consumed power varies. For example, in a handheld the output voltage VO of the down-converter is varied corresponding to an output power to be transmitted by an amplifier which receives the output voltage VO as its power supply source to obtain an optimal use of the energy of a battery. If a low output power has to be transmitted, the output voltage VO should have a corresponding low level, if a high output power has to be transmitted, the output voltage VO should have a corresponding high level.

Such a prior art down-converter has the drawback that the dynamic behavior strongly depends on the level of the output voltage VO. If the output voltage VO has a level near the input voltage VIN, it takes a relatively long period of time to increase the output power because, due to the small voltage difference across the inductor L it takes a long time to sufficiently increase the current IL through the inductor L. In the same way, if the output voltage VO is near zero, it takes a relatively long period of time to decrease the output power because, due to the small voltage difference across the inductor L it takes a long time to sufficiently decrease the current IL through the inductor L.

Figure 2:
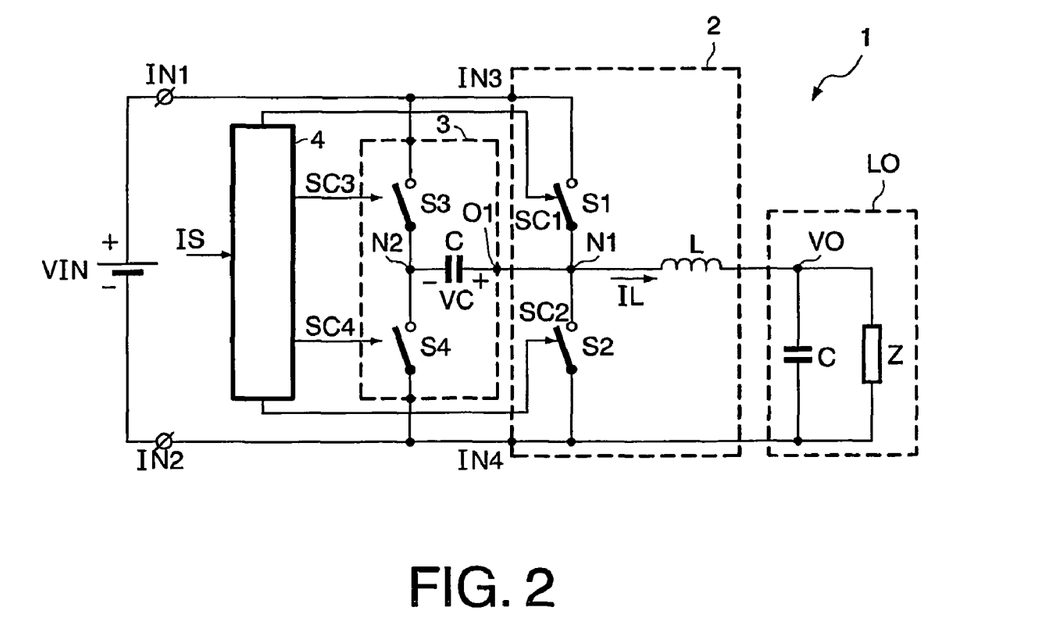
FIG. 2 shows a circuit diagram of a power converter in accordance with an embodiment of the invention.

FIG. 2 shows a circuit diagram of a power converter in accordance with an embodiment of the invention. FIG. 2 shows the same down-converter as shown in FIG. 1, wherein the control switch SW now is denoted S1 and wherein the diode D is replaced by a controllable switch S2. Also the load LO and the DC input voltage source VIN are identical with the load LO and the input voltage source VIN, respectively, as shown in FIG. 1. The down-converter 2 of FIG. 2 operates in the same manner as that shown in FIG. 1

The power converter further comprises a voltage level increasing circuit 3 which has inputs connected to the inputs IN1 and IN2 to receive the input voltage VIN and an output O1 connected to the node N1.

The controller 4 controls the switches S1, S2 of the down-converter 2 and the voltage level increasing circuit 3 such that either the input voltage VIN or the output voltage of the voltage level increasing circuit 3 is supplied to the node N1. If the switch S1 is closed and the voltage level increasing circuit 3; does not influence the voltage at the node N1 the input voltage VIN is supplied to the node N1. In the other mode, the output voltage of the voltage level increasing circuit 3, which is also referred to as the adapted input voltage, is supplied at the output O1 to the node N1 and the switch S1 is open. Thus, it is possible to select between the input voltage VIN and the adapted input voltage at the node N1.

The switching cycle of the down-converter refers to the period of time elapsing between two successive instants at which the switch S1 is opened. The period of time during the switching cycle when the switch S1 is closed is referred to as the on-time of the switch S1. The period of time during the switching cycle when the switch S1 is opened is referred to as the off-time of the switch S1. The switching period is the sum of the on-time and the off-time in a same switching cycle.

The voltage level increasing circuit 3 may supply a voltage that has the same polarity and is larger than the voltage VIN. For example, if the input voltage VIN has a positive polarity, now instead of closing the switch S1 to supply the input voltage VIN to the node N1, the voltage level increasing circuit supplies a positive voltage with a higher level than the input voltage VIN to the node N1. This is advantageous if the load current increases and as fast a response as possible is required, or if the output voltage VO has to increase within as short a period of time as possible. Or if the output voltage VO is close to the level of the input voltage VIN. The voltage level increasing circuit 3 may supply a voltage that has a polarity opposite to the polarity of the input voltage VIN. Now, instead of closing the switch S2 to connect the node N1 to ground, the voltage level increasing circuit supplies the voltage with the opposite polarity to the node N1. This is advantageous if the load current decreases and as fast a response as possible is required, or if the output voltage VO has to decrease within as short a period of time as possible. Or if the output voltage is close to ground level.

In an embodiment, the voltage level increasing circuit 3 comprises a switch S3, a switch S4, and a capacitor C. The switch S3 has a main current path arranged between the terminal IN1 and a node N2, and a control electrode to receive a control signal SC3 from the controller 4. The switch S4 has a main current path arranged between the terminal IN2 and the node N2, and a control electrode to receive a control signal SC4 from the controller 4. The capacitor is arranged between the node N2 and the node N1. The controller 4 receives an input signal IS which determines the mode in which the down-converter has to operate. In all modes of operation, it is assumed that all the components are ideal. For example, the impedance of the main current paths of the switches is neglected.

In a first mode the input voltage VIN is supplied to the node N1. The switches S1 and S2 are operated as usual for a down-converter. The switches S3 and S4 may be continuously open so that the capacitor C is floating and has no influence on the voltage at the node N1. The charge in the capacitor C is not influenced.

In a second mode, the switch S4 may be closed synchronously with the switch S1. Now, when the switches S1 and S4 are closed, the capacitor C will be charged so that voltage VC across the capacitor C will become equal to the voltage at the node N1 when the switch S1 is closed. Thus, the voltage VC becomes identical with VIN. The switch S4 may also be closed during part of the on-time of the switch S1. When the switches S1 and S4 are open, the charged capacitor C is floating and the voltage VIN is supplied to the node N1.

In a third mode, starting from the charged capacitor C as discussed with respect to the second mode, if the voltage at the node N1 should become higher than the input voltage VIN, the switch S3 is closed for a period, of time, otherwise the switch S1 would be closed, and the switch S4 is continuously opened. Thus now, the adapted input voltage is supplied to the node N1. The adapted input voltage is equal to 2*VIN because the voltage VC across the capacitor C is switched in series with the input voltage VIN. During the off-time of the switch S3, the switch S2 is closed, as usual. It has to be noted that the switch S3 is periodically closed while the switch S1 is continuously opened, and thus it is impossible to charge the capacitor C. Thus, the higher voltage can only be supplied to the node N1 temporarily. It is possible to alternate the second and third modes after every switching cycle of the down-converter, or after a predetermined number of switching cycles.

In a fourth mode, the switch S3 may be closed synchronously with the switch S2. Now, when the switches S3 and S2 are closed, the capacitor C will be charged so that voltage VC across the capacitor C will become equal to the voltage VIN but with the opposite sign. In the example shown in FIG. 2, the voltage VC becomes equal to −VIN. The switch S3 may also be closed during part of the on-time of the switch S2. When the switches S3 and S4 are open, the charged capacitor IQ is floating and the voltage VIN is supplied to the node N1.

In a fifth mode, starting from the charged capacitor C as discussed with respect to the fourth mode, if the voltage at the node N1 should become lower than ground level, the switch S4 is closed for a period of time, otherwise the switch S1 would be closed, and the switch S3 is continuously opened. Thus now the adapted input voltage is supplied to the node N1. The adapted input voltage is equal to −VIN because the voltage VC across the capacitor C is switched between the node N1 and ground level, which is considered to be zero volts. During the off-time of the switch S4, the switch S1 is closed, as usual. It has to be noted that the switch S4 is periodically closed while the switch S2 is continuously opened, and thus it is impossible to charge the capacitor C to −VIN. Thus, the negative voltage can only be supplied to the node N1 temporarily. It is possible to alternate the fourth and fifth modes after every switching cycle of the down-converter, or after a predetermined number of switching cycles.

The switching between the modes is controlled by the control circuit 4 based on the input signal IS. The input signal IS can be obtained in many ways. For example, to cater for load steps, it may be checked whether the output voltage VO, a difference between the output voltage VO and a reference voltage (the error voltage), a derivative of the output voltage VO, the current through the inductor L, or the difference between the current through the inductor and a target value (again an error signal) exceeds a reference level. It may also be known from the circuits Z of the load LO when what load step is expected to occur, for example, in a handheld transmitter it may be known beforehand when the transmission power has to be increased.

If the level of the output voltage VO has to be varied, the input signal IS indicates the variation of the output voltage VO. For example, in a handheld transmitter it may be known beforehand when the transmission power has to be increased and thus the power supply voltage of the transmitting amplifier has to be increased.

Figures 3, 5:
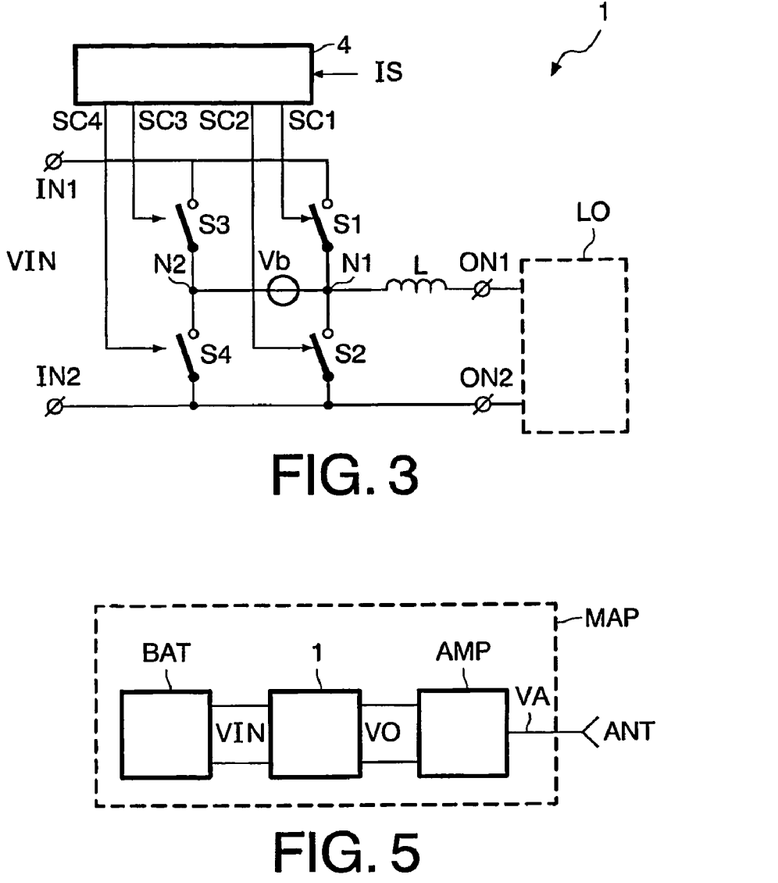
FIG. 3 shows a circuit diagram of another power converter in accordance with an embodiment of the invention.
FIG. 5 shows a mobile apparatus.

FIG. 3 shows a circuit diagram of another power converter in accordance with an embodiment of the invention. The power converter shown in FIG. 3 is based on the power converter shown in FIG. 2. The difference is that the capacitor C has been replaced by a battery Vb. Again, the down-converter can be operated in several modes indicated by the input signal IS by controlling the switches S1, S3 and S4 accordingly.

In a first mode, the switches S1 and S2 are periodically closed and opened as usual in down-converters. The switches S3 and S4 are open continuously. The battery Vb is floating and has no influence on the voltage at the node N1. During the on-time of the switch S1, the input voltage VIN is supplied to the node N1.

In a second mode, the switch S3 is periodically closed and opened instead of the switch S1, which is now continuously open. Now the sum of the input voltage VIN and the voltage of the battery Vb is supplied to the node N1. If the battery Vb supplies a voltage that has the same polarity as the input voltage VIN, the level of the voltage at the node N1 becomes more positive or more negative than the input voltage VIN.

In a third mode, the switch S4 is periodically closed and opened instead of the switch S2, which is now continuously open. Now the voltage of the battery Vb is supplied to the node. If the battery Vb supplies a voltage that has the opposite polarity to the input voltage VIN, the node N1 has a negative potential if the input voltage has a positive potential. The decrease of the current in the inductor L becomes larger because a negative voltage instead of zero volts is present at the node N1.

The use of a battery Vb instead of a capacitor C has the advantage that the voltage at the node N1 can be increased above the input voltage VIN or decreased below ground level for a relatively long period of time. The problem of the discharging of the capacitor C is obviated. It is possible to use a relatively small rechargeable battery which can be charged through the switches already available, by extra switches during the period of time it need not supply its voltage to the node N1, or by commonly known battery charging means which are not depicted.

The embodiment shown in FIG. 3 may be adapted in several ways. If both a higher and a lower voltage than the input voltage VIN and ground level, respectively, is required at the node N1, two batteries may be provided. One battery can be connected in series with the input voltage VIN via the switch S3 to increase the voltage supplied to the node N1 above the input voltage VIN. The other battery can be connected between the node N1 and ground with the switch S4 to obtain a voltage at the node N1 which has the opposite polarity to the input voltage VIN. Now, the switches S3 and S4 are not interconnected at the node N2 anymore. Alternatively, extra switches may be introduced which are able to connect a single battery in two polarities between the node N1 and one of the switches S3 or S4. If only higher voltage than the input voltage VIN or a lower voltage than the ground level is required, a single battery with the associated one of the switches S3 or S4 is required. Thus, if only a higher voltage than the input voltage VIN is required at the node N1, the switch S4 may be omitted and, optionally, the switch S2 may be replaced by a diode as shown in FIG. 1. However, the replacement of a switch by a diode may lower the efficiency.

Figure 4:
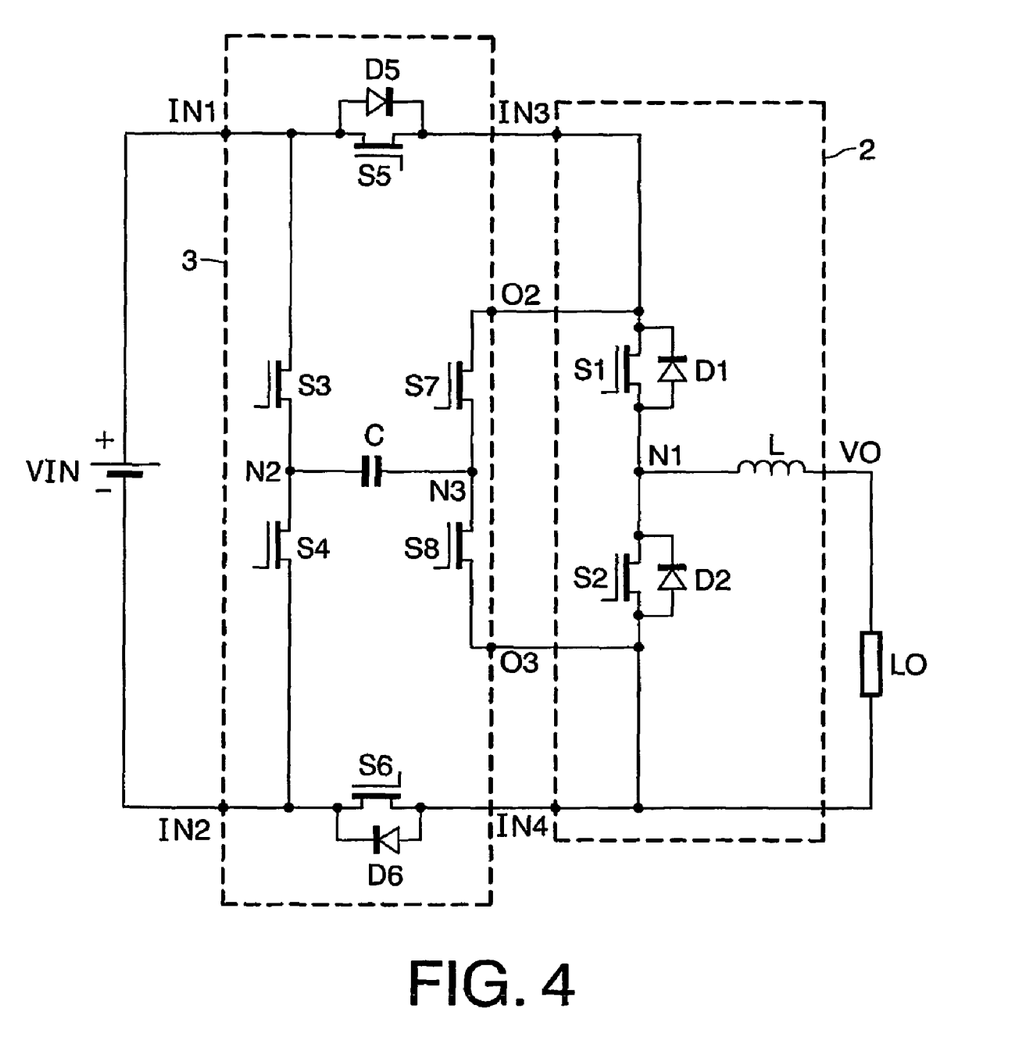
FIG. 4 shows a circuit diagram of another power converter in accordance with an embodiment of the invention.

FIG. 4 shows a circuit diagram of another power converter in accordance with an embodiment of the invention. Elements in FIG. 4 which have the same references as in FIG. 2 have the same function. In FIG. 4, the switches of FIG. 2 are replaced by MOSFET transistors. The intrinsic diodes of the MOSFETs are indicated where relevant. The intrinsic diodes of the switches S3, S4, S7 and S8 (not shown) have their cathodes directed towards the terminal IN1.

The power converter comprises the down-converter 2 and the voltage level increasing circuit 3. The inputs IN1 and IN2 of the power converter receive the DC-input voltage VIN. The down-converter has inputs IN3 and IN4 and supplies the output voltage VO to the load LO connected to the output of the power converter. Again, for the ease of operation, it is assumed that the smoothing capacitor is part of the load LO.

The down-converter 2 has the same topology as the down-converter 2 shown in FIG. 2 wherein: the switch S1 is now a MOSFET S1 with its intrinsic diode D1, the switch S2 is now a MOSFET S2 with its intrinsic diode D2.

The voltage level increasing circuit 3 comprises the MOSFETs S3 to S8 and the capacitor C. The MOSFET S3 has a main current path arranged between the power converter input IN1 and a node N2. The MOSFET S4 has a main current path arranged between the node N2 and the power converter input IN2. The third MOSFET S5 has a main current path arranged between the power converter input IN1 and the down-converter input IN3. The MOSFET S5 has an intrinsic diode D5. The fourth MOSFET S6 has a main current path arranged between the power converter input IN2 and the down-converter input IN4. The MOSFET S6 has an intrinsic diode D6. The fifth MOSFET S7 has a main current path arranged between the down-converter input IN3 and a node N3. The sixth MOSFET S8 has a main current path arranged between the down-converter input IN4 and the node N3. The capacitor C is arranged between the nodes N1 and N3.

In a normal operating mode, the MOSFETs S5 and S6 are continuously closed and the down-converter receives the DC-input voltage VIN at its inputs IN3 and IN4. The state of the other MOSFETs of the voltage level increasing circuit 3 is not relevant as long as on either side of the capacitor C not both MOSFETs are conductive because this would cause a short circuit. Thus, only one of the MOSFETs S3 or S4, and only one of the MOSFETs S7 or S8 should be closed at the same time. The switches S1 and S2 are operated as usual in a down-converter.

In another mode of operation, the capacitor C is periodically charged to obtain a voltage at the node N3 which is positive with respect to a voltage at the node N2. The capacitor C is periodically connected to the down-converter input IN3 to increase a voltage at this down-converter input IN3 to above the DC-input voltage VIN. Thus, during the charging period of the capacitor C, the MOSFETs S4, S5, S6 and S7 are closed, while the other MOSFETs S3 and S8 are open. The capacitor C is charged so that almost the input voltage VIN occurs between the nodes N3 and N2. The down-converter 2 is able to operate in the normal mode during the charging period. During the voltage boosting period, the voltage across the capacitor C is added to the DC-input voltage VIN and supplied to the down-converter input IN3 when the MOSFETs S3 and S7 are closed while the MOSFETs S4, S5 and S8 are open. Also during the boosting period, the down-converter 2 is able to operate as in the normal mode, but instead of the positive input voltage VIN now the sum of the input voltage VIN and the voltage across the capacitor C is supplied to the down-converter 2. Thus in fact almost 2*VIN is available to the down-converter 2. The voltage boosting period may not last too long because otherwise the capacitor C will be discharged too much. The charge in and thus the voltage across the capacitor has to be kept sufficiently high by alternating between the charging period and the boosting period.

In a further mode of operation, the capacitor C is periodically charged to obtain a voltage at the node N3 which is negative with respect to a voltage at the node N2. The capacitor C is periodically connected to the down-converter input IN4 to lower a voltage at this input IN4. Thus, during the charging period of the capacitor C the MOSFETs S3, S5, S6, and S8 are closed, while the other MOSFETs S4 and S8 are open. The capacitor C is charged so that almost the input voltage VIN occurs between the nodes N2 and N3. The down-converter 2 is able to operate in the normal mode during the charging period. During the boosting period, the voltage across the capacitor C is supplied between ground and the down-converter input IN4 by having the MOSFETs S4 and S8 closed while the MOSFETs S3, S6, S7 are open. Also during the boosting period the down-converter 2 is able to operate as in the normal mode, but instead of the positive input voltage. VIN now the negative voltage across the capacitor C is supplied to the down-converter 2. The negative voltage across the capacitor C is almost equal to the input voltage VIN, thus now the down-converter 2 is fed with −VIN instead of VIN.

If instead of the capacitor a battery is used (not shown) in a single polarity, dependent on the polarity of the battery, the circuit shown in FIG. 4 can be simplified. First it is assumed that the battery has the plus pole at the node N3, the switches S6 and S7 are replaced by a short circuit, and the switch S8 is omitted. Now, if the switch S5 is continuously closed and both the switches S3 and S4 are open, the battery is floating and has no influence. If voltage boost is required, the switch S3 is closed and the switch S5 is opened. Now, the battery which supplies the input voltage VIN and the extra battery are arranged in series and a relatively high voltage is supplied to the terminal IN3. If the switch S4 is closed and the switch S5 is open, only the extra battery is used to supply the power to the down-converter. This might in particular be relevant if the load LO is drawing a relatively low current from the down-converter. It is also possible to use both batteries in parallel, but this is only possible if the battery voltages supplied are identical and/or special circuitry is present to avoid current of one battery to flow through the other battery. If the extra battery is not rechargeable and only a voltage boost is required, even the switch S4 may be omitted.

Preferably, the extra battery is rechargeable. The rechargeable battery is charged when both the switches S5 and S4 are closed, while the switch S3 is open. Extra circuitry may be required to provide excessive currents during charging.

Alternatively, the battery which replaces the capacitor C may supply a negative voltage at the node N3. Now, the switches S5 and S8 are replaced by a short circuit, and switch S7 is omitted. At least the switch S4 should be present to be able to supply the negative battery voltage to the node N3 when the switch S6 is open.

FIG. 5 shows a mobile apparatus. The mobile apparatus MAP comprises a battery BAT, the down-converter 1, an amplifier AMP, and an antenna ANT. The battery BAT supplies the input voltage VIN to the down-converter 1. The down-converter 1 supplies the output voltage to the amplifier AMP which supplies an antenna signal Va to be transmitted to the antenna ANT. The output voltage VO supplied to the amplifier AMP should optimally fit the actual transmission power desired or required to optimize the useful time of the battery BAT. Thus, at a low transmission power a low output voltage VO should be supplied to the amplifier AMP and at a high transmission power a high output voltage should be supplied to the amplifier AMP. The improved down-converter in accordance with the invention is able to change its output voltage VO faster due to the higher voltages present across the inductor L. Thus, the down-converter of the present invention is able to switch to the lower output voltage faster which saves power. On the other hand, the higher voltage will still be present in time if it is generated later, which again saves power. Further, the down-converter of the present invention will react to load steps much faster.

In this application, the power supply system requires a bandwidth of tens of kilohertz.

Although not shown in a Figure, the load LO may be a loudspeaker. Because the power-envelope of the audio signal is known, the power supply voltage of the amplifier AMP can be changed at the correct instant. The mobile apparatus MAP may now be a MP3 player.

Figure 6:
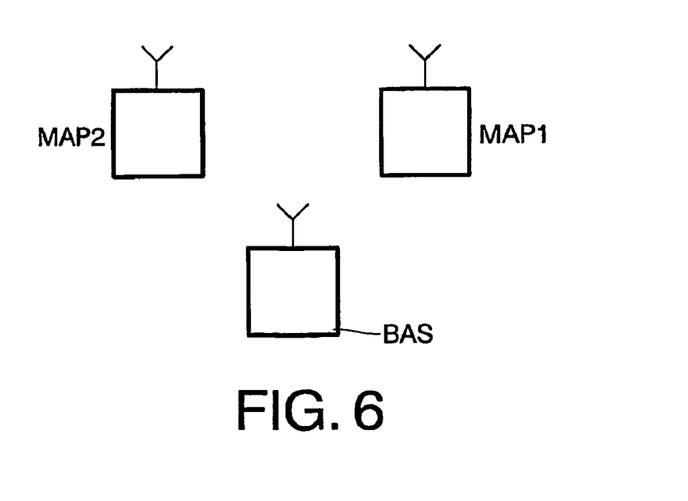
FIG. 6 shows a wireless transmission system.

FIG. 6 shows a wireless transmission system. The wireless system comprises a base station BAS and several handhelds MAP1, MAP2 two of which are shown. The handhelds MAP1 and MAP2 both may be identical with the handheld MAP of FIG. 4. The handhelds MAP1 and MAP2 communicate with each other via the base station BAS. The base station BAS controls the communication in the system. For example, the base station BAS may check the power received from each one of the handhelds MAP1, MAP2 and may send control signals to the handhelds MAP1, MAP2 to adapt their transmission power so that the base station BAS receives a sufficiently strong signal but not too strong a signal. Too strong signals will deplete the battery of the handheld MAP1, MAP2 too fast and may cause interference in the system. If the received power is too low, for example because the handheld MAP1, MAP2 is far away, or the direct line of sight is interrupted, the quality of transmission would be too low. In today's wireless communication systems only short time slots are present to change the transmission output power of the handhelds MAP1, MAP2. The voltage VO supplied to the transmitter amplifier AMP should be changed within these short time slots to optimize the power consumption from the battery BAT.

It should be noted that the above-mentioned embodiments illustrate rather than limit the invention, and that those skilled in the art will be able to design many alternative embodiments without departing from the scope of the appended claims.

For example, the down-converter in accordance with the invention may be used in any systems in which a fast response to load variations is required, or in any systems in which the output voltage has to vary within a short period of time. The down-converter in accordance with the present invention is especially useful in portable, battery supplied, equipment like cell-phones, or in other circumstances wherein the available energy is scarce and low power consumption is of the utmost importance. Since power consumption is an issue for many applications, the down-converter in accordance with the present invention may be applied in a stand-alone integrated circuit (IC), or may be embedded in a system on chip (SOC) or a system in package (SiP).

Although the embodiment shown in FIG. 2 only shows a single stage voltage multiplier it is possible to use multistage voltage multipliers of which the last stage is identical with the stage shown. Alternatively, it is possible to use other circuits which increase the input voltage, such as a battery shown in FIG. 3, or a small switched-mode power supply which only needs to be able to temporarily supply a voltage to the node N1 when the load step occurs or when the output voltage has to change levels.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A power converter comprising:
a voltage level increasing circuit being coupled between first and second power converter inputs for receiving a DC-input voltage, and having an output for supplying an adapted input voltage having either a higher level than the input voltage or a polarity opposite to the input voltage,
a down-converter having first and second down-converter inputs, a control switch with a main current path arranged between a first node and the first down-converter input, an inductor arranged between the first node and a load, and a sync switch arranged between the first node and the second down-converter input,
a controller for controlling the control switch, and switches of the voltage level increasing circuit for either coupling the input voltage or the adapted input voltage to the first node or to the first or second down-converter input, and
wherein the voltage level increasing circuit comprises:
a first controllable switch having a main current path arranged between the first power converter input and a second node,
a second controllable switch having a main current path arranged between the second node and the second power converter input, and
a capacitor arranged between the first node and the second node, and wherein the controller either activates the control switch or one of the first controllable switch or the second controllable switch to supply the input voltage or the adapted input voltage to the first node, respectively.

2. A power converter as claimed in claim 1, wherein the voltage level increasing circuit comprises part of a voltage multiplier.

3. A power converter as claimed in claim 1, wherein the controller is arranged for supplying a first control signal to the first controllable switch, a second control signal to the second controllable switch, and a third control signal to the control switch to provide two phases of operation:
   in a first phase, the first controllable switch is open and the second controllable switch and the control switch are closed for charging the capacitor and for supplying the input voltage to the first node, and
   in a second phase, the control switch and the second controllable switch are open and the first controllable switch is closed for supplying the adapted input voltage to the first node.

4. A power converter as claimed in claim 1, wherein the controller is arranged for supplying a first control signal to the first controllable switch, a second control signal to the second controllable switch, a third control signal to the control switch, and a fourth control signal to the sync switch to provide two phases of operation:
   in a first phase, the first controllable switch and the sync switch are closed and the second controllable switch and the control switch are opened for charging the capacitor while the inductor is coupled in parallel with the load, and
   in a second phase, the first controllable switch, the control switch and the sync switch are open and the second controllable switch is closed for supplying the adapted input voltage to the first node.

5. A power converter as claimed claim 3, wherein the controller is arranged for intermittently operating the power converter in the first phase and the second phase.

6. A power converter as claimed in claim 1, wherein the first and second down-converter inputs are arranged to receive the DC-input voltage.

7. A power converter as claimed in claim 1, wherein the voltage level increasing circuit further comprises:
   a third controllable switch having a main current path arranged between the first power converter input and the first down-converter input,
   a fourth controllable switch having a main current path arranged between the second power converter input and the second down-converter input,
   a fifth controllable switch having a main current path arranged between the first down-converter input and a third node,
   a sixth controllable switch having a main current path arranged between the second down-converter input and the third node, and
   a capacitor arranged between the first node and the third node, and wherein the controller is arranged to control the first to sixth controllable switches to periodically either charge the capacitor to obtain a voltage at the third node being positive with respect to a voltage at the second node, and to connect the capacitor to the first down-converter input to increase a voltage at this first down-converter input to above the DC-input voltage, or
   charge the capacitor to obtain a voltage at the third node which is negative with respect to a voltage at the second node, and to connect the capacitor to the second down-converter input to lower a voltage at this second down-converter input.

8. A power converter as claimed in claim 1, wherein the controller has an input for receiving an load step signal representative of a step requested by the load to supply the adapted input voltage to the first node if the load step signal exceeds a predetermined value.

9. A power converter as claimed in claim 8, wherein the load step signal is an output voltage of the power converter across the load, or the output voltage differentiated with respect to time, an error voltage indicating a difference between the output voltage and a reference voltage, a current through the inductor, or a signal present in a circuit of the load indicating said requested step.

10. A power converter as claimed in claim 1, wherein the controller has an input for receiving a command signal representative of a desired output voltage step of an output voltage of the power converter across the load to supply the adapted input voltage to the first node if the step of the output voltage or its derivative exceeds a predetermined value.

11. A power converter as claimed in claim 1, wherein the controller has an input for receiving an output voltage from the power converter across the load to supply the adapted input voltage to the first node if a difference between the output voltage and the input voltage becomes smaller than a predetermined value, or if the level of the output voltage drops below the predetermined value.

12. A power converter as claimed in claim 1, wherein the down-converter further comprises a further switching element arranged between the first node and an end of the load not connected to the inductor.

13. A power converter comprising:
   a voltage level increasing circuit being coupled between first and second power converter inputs for receiving a DC-input voltage, and having an output for supplying an adapted input voltage having either a higher level than the input voltage or a polarity opposite to the input voltage,
   a down-converter having first and second down-converter inputs, a control switch with a main current path arranged between a first node and the first down-converter input, an inductor arranged between the first node and a load, and a sync switch arranged between the first node and the second down-converter input,
   a controller for controlling the control switch, and switches of the voltage level increasing circuit for either coupling the input voltage or the adapted input voltage to the first node or to the first or second down-converter input, and
   wherein the voltage level increasing circuit further comprises:
      a first controllable switch having a main current path arranged between the first power converter input and a second node,
      a second controllable switch having a main current path arranged between the first power converter input and the first down-converter input,
      a battery arranged between the second node and the first down-converter input with its negative pole coupled to the second node, and wherein the second power converter input and the second down-converter input are interconnected, and wherein the controller is arranged for either activating the second controllable switch or the first controllable switch to supply the input voltage or the adapted input voltage, being the sum of the DC-input voltage and a battery voltage of the battery, to the first down-converter input, respectively.

14. A power converter comprising:
   a voltage level increasing circuit being coupled between first and second power converter inputs for receiving a DC-input voltage, and having an output for supplying an adapted input voltage having either a higher level than the input voltage or a polarity opposite to the input voltage, a down-converter having first and second down-converter inputs, a control switch with a main current path arranged between a first node and the first down-converter input, an inductor arranged between the first node and a load, and a sync switch arranged between the first node and the second down-converter input, a controller for controlling the control switch, and switches of the voltage level increasing circuit for either coupling the input voltage or the adapted input voltage to the first node or to the first or second down-converter input, and wherein the voltage level increasing circuit further comprises:
- a first controllable switch having a main current path arranged between the second power converter input and a second node,
- a second controllable switch having a main current path arranged between the second power converter input and the second down-converter input,
- a battery arranged between the second node and the second down-converter input with its positive pole being coupled to the second node, and wherein the first power converter input and the first down-converter input are interconnected, and wherein the controller is arranged for either activating the second controllable switch or the first controllable switch to supply the input voltage or the adapted input voltage, being a voltage of the battery, to the second down-converter input, respectively.

15. A mobile apparatus comprising the power converter as claimed in claim 1, a battery for supplying the input voltage to the power converter, and an amplifier for receiving the output voltage supplied by the power converter.

16. A wireless transmission system having various operation modes comprising an active mode and at least one of the following idle, sleep or standby modes, the wireless transmission system comprising at least one mobile apparatus as claimed in claim 15 and a base station for communication with the at least one mobile apparatus.

17. A power converter comprising:
  a voltage level increasing circuit being coupled between first and second power converter inputs for receiving a DC-input voltage, and having an output for supplying an adapted input voltage having either a higher level than the input voltage or a polarity opposite to the input voltage,
  a down-converter having first and second down-converter inputs, a control switch with a main current path arranged between a first node and the first down-converter input, an inductor arranged between the first node and a load, and a sync switch arranged between the first node and the second down-converter input,
  a controller for controlling the control switch, and switches of the voltage level increasing circuit for either coupling the input voltage or the adapted input voltage to the first node or to the first or second down-converter input, and
  wherein the voltage level increasing circuit comprises:
    a first controllable switch having a main current path arranged between the first power converter input and a second node,
    a second controllable switch having a main current path arranged between the second node and the second power converter input, and
    a battery arranged between the first node and the second node, and wherein the controller either activates the control switch or one of the first controllable switch or the second controllable switch to supply the input voltage or the adapted input voltage to the first node, respectively.

18. A power converter as claimed in claim 17, wherein the battery comprises a rechargeable battery.

* * * * *

UNITED STATES PATENT AND TRADEMARK OFFICE
CERTIFICATE OF CORRECTION

| | |
|---|---|
| PATENT NO. | : 7,960,949 B2 |
| APPLICATION NO. | : 11/719213 |
| DATED | : June 14, 2011 |
| INVENTOR(S) | : Frans Schoofs |

It is certified that error appears in the above-identified patent and that said Letters Patent is hereby corrected as shown below:

Column 1, line 52, delete "18" and insert -- 15 --.
Column 1, line 54, delete "19" and insert -- 16 --.
Column 6, line 36, after "3" delete ";".
Column 7, line 36, after "period" delete ",".
Column 7, line 57, delete "IQ" and insert -- C --.
Column 10, line 42, after "voltage" delete ".".

Signed and Sealed this
Twenty-ninth Day of November, 2011

David J. Kappos
*Director of the United States Patent and Trademark Office*